Aug. 21, 1928.

J. E. CONKLIN 1,681,838

FAUCET CONNECTION

Filed April 19, 1927

Inventor
J. E. Conklin
By Watson E. Coleman
Attorney

Patented Aug. 21, 1928.

1,681,838

UNITED STATES PATENT OFFICE.

JOHN EDWARD CONKLIN, OF BROOKLYN, NEW YORK.

FAUCET CONNECTION.

Application filed April 19, 1927. Serial No. 185,004.

This invention relates to couplings or faucet connections which are used for the purpose of securing relatively small rubber or other tubes to faucets, these connections being principally used for engaging spray devices with faucets. Connections are made for this purpose but ordinarily these connections are adapted for only one size of faucet and usually are adapted for use with a reducer which is secured inside of the faucet and which has a relatively small nipple. These reducers are often difficult to get even from regular plumbers and it is also quite difficult to get reducers which will fit any particular faucet, faucets not being made of standard dimensions.

The general object of the present invention is to provide a faucet connection which is so made that it will take different sizes of faucets, as for instance, a faucet having a diameter of 1¼ inches, a faucet of ½ inch in diameter, or one of ¼ inch.

A more particular object of the invention is to form a faucet connection of this character which is formed of flexible rubber throughout its entire extent, and is further so constructed that the passage of water through the connection will draw a portion of the air from the chambers formed within the connection, and the outside air pressing against the thin and flexible walls of the connection will force them tightly into engagement with the faucet, thus causing the device to fit so tightly upon the faucet that it will not slip therefrom even when the tube to which the connection is attached is being moved to various positions to discharge the spray from the spray head against the body of the bather.

A further object of the invention is to form a connection of this character comprising a rubber body with a metal nipple embedded therein, the body being so formed that it may be fitted over any faucet and provide a suction chamber, and a further object is to provide means whereby this connection may be held in place upon the faucet against any possible chance of detachment.

My invention is illustrated in the accompanying drawings, wherein:—

Figure 1:
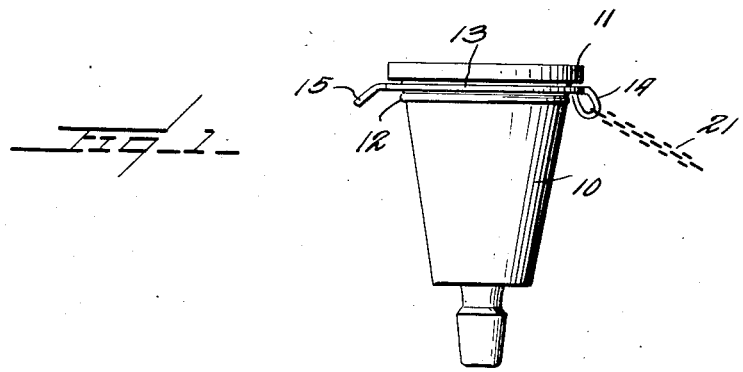
Figure 1 is an elevation of a faucet adaptor or connection made in accordance with my invention.
Figure 2:
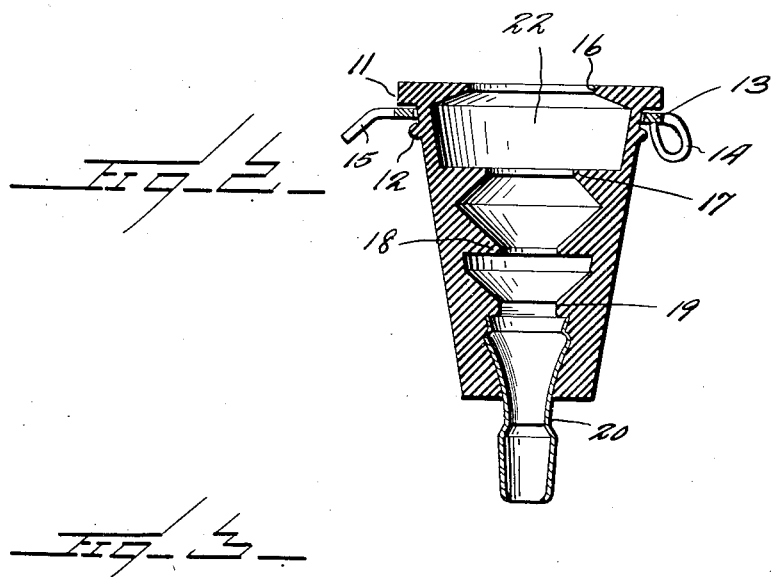
Figure 2 is a longitudinal sectional view of the same.
Figure 3:
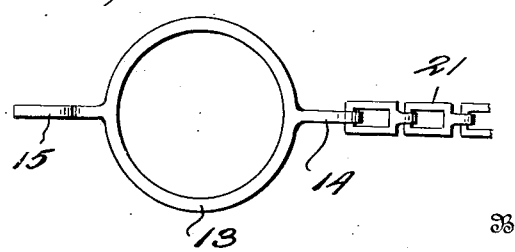
Figure 3 is a top plan view of the ring and a portion of the chain.

Referring to these drawings, it will be seen that the body 10 of the connection is formed of rubber. Exteriorly, this body has the general form of a frustrum of a cone and is provided at its larger end with a flange 11 and immediately beneath this flange with a small bead 12. Fitting around the upper end of the body between this bead and the flange is a ring 13 of metal having at one point a loop 14 and at the other an outwardly projecting lug 15. Interiorly, the body is formed with a flexible annular flange 16 which extends over the hollow interior of the body and defines a central opening about ¾ of an inch wide. Below the flange 16 and spaced therefrom the body is formed with a second flange 17 having a smaller interior diameter and below this with a third flange 18 having a still smaller interior diameter. These flanges are adapted to engage with a faucet. The flange 16 will engage with a large faucet, as for instance, a faucet of one and one-fourth inches, or faucets of approximately this diameter, the second flange with one-half inch faucets, and the third with one-fourth inch faucets, and above the lower end, there is formed a fourth flange 19 which will engage a faucet having a diameter of three-sixteenths of an inch. It is to be particularly noted that the body of the faucet is formed of flexible rubber throughout its entire extent. This is an important feature of my invention. Embedded in the lower end of the body 10 and interlocked therewith at the time when the body 10 is formed, is a metal nipple 20 so formed that a small hose may be engaged therewith. A chain 21 is attached to the eye 14, this chain being made of open links and in use this chain is passed over the top of the faucet and one of the links engaged with the lug 15 and thus the connection will be held against any possible accidental detachment.

I do not wish to be limited to the use of a metal nipple 20 as this may be made of hard rubber or any other suitable material. In the use of this device, when the faucet is turned on the sweep of the water through the connection acts to draw a portion of the air from the several cooperating chambers and this causes the pressure of the exterior atmosphere to force the thin and flexible walls of the connection inward against the faucet, binding thereon so tightly that the device will not slip off of the faucet even when the spray tube is being handled or subjected to the strain normally placed on it when a bather is using the spray head. By this means I cause the attachment to adhere to the faucet and prevent back wash and leaking of water. Each successive chamber acts in a similar manner as the body is forced further on the faucet. Thus each chamber acts as an additional grip to hold the connection to the faucet by suction.

I claim:—

1. A faucet connection of the character described comprising a hollow body of soft and flexible rubber open at its upper and lower ends, the upper end of the body having an inwardly extending faucet engaging flange defining an aperture having a relatively large diameter, the lower end of the body having an inwardly extending flange defining an aperture of considerably less diameter, the body being readily flexible throughout its entire extent.

2. A faucet connection of the character described comprising a body of soft rubber having a hollow interior, opening through the body at its upper and lower ends, the body being readily flexible throughout its entire extent the upper end of the body being formed with an inwardly projecting flexible annular faucet engaging flange and the interior of the flange defining the upper end of a suction chamber, the interior of the body being formed with a plurality of inwardly projecting annular flexible flanges successively decreasing in interior diameter from the top toward the bottom of the body.

3. A faucet connection of the character described comprising a body of soft rubber having a hollow interior opening through the body at its upper and lower ends, the body being readily flexible throughout its entire extent, the upper end of the body being formed with an inwardly projecting flexible annular faucet engaging flange and the interior of the flange defining the upper end of a suction chamber, the interior of the body being formed with a plurality of inwardly projecting annular flexible flanges successively decreasing in interior diameter from the top toward the bottom of the body, a ring carried upon the upper end of the body and having a lug projecting therefrom, and a chain connected to the ring and adapted to be engaged with said lug.

In testimony whereof I hereunto affix my signature.

JOHN EDWARD CONKLIN.